United States Patent [19]
Kessler et al.

[11] 3,710,247
[45] Jan. 9, 1973

[54] CABLE TERMINAL FOR HIGH VOLTAGE CABLES

[75] Inventors: Claus Kessler; Werner Kohler, both of Berlin, Germany

[73] Assignee: Siemens Aktiengesellschaft, Berlin and Munich, Germany

[22] Filed: Sept. 8, 1970

[21] Appl. No.: 70,047

[52] U.S. Cl. .......................324/96, 174/73, 174/139
[51] Int. Cl. ......G01r 31/00, H02g 3/00, H01d 17/00
[58] Field of Search ...324/96; 174/73 R, 73 SC, 139, 174/142, 143, 75 R, 75 D

[56] References Cited

UNITED STATES PATENTS

| | | |
|---|---|---|
| 3,450,827 | 6/1969 | Phillips...................................174/73 |
| 1,981,716 | 11/1934 | Austin...............................174/139 X |
| 1,775,529 | 9/1930 | Jansson............................174/139 X |

Primary Examiner—Alfred E. Smith
Attorney—Curt M. Avery, Arthur W. Wilfond, Herbert L. Lerner and Daniel J. Tick

[57] ABSTRACT

A circuit device electrically connects a bus bar to a high voltage cable core of a cable terminal. The cable terminal has an insulating body for supporting the cable core relative to ground. A voltage transformer is structurally combined with the cable terminal and has a dielectric comprising part of the insulating body of the cable terminal.

9 Claims, 3 Drawing Figures

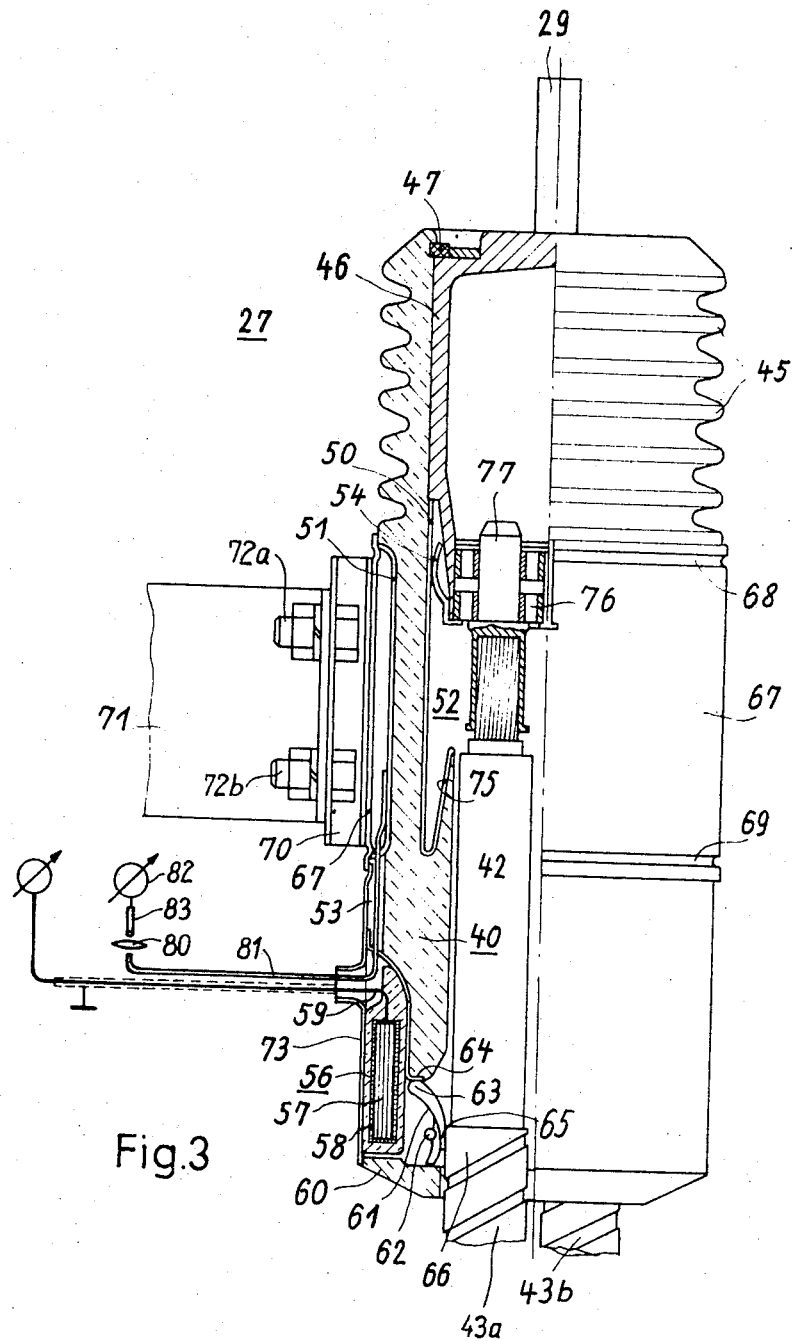

CABLE TERMINAL FOR HIGH VOLTAGE CABLES

DESCRIPTION OF THE INVENTION

The invention relates to a high voltage switch cell. More particularly, the invention relates to a high voltage switch cell having a bus bar, a voltage transformer and a circuit device for electrically connecting the bus bar to the cable core of a cable terminal. The cable terminal has an insulating body for supporting the cable core of the cable terminal relative to ground.

The principal object of the invention is to provide a new and improved high voltage switch cell.

An object of the invention is to provide a high voltage switch cell which is compact and utilizes a minimum of space.

An object of the invention is shows provide a high voltage switch cell which is of simple structure.

An object of the invention is to provide a high voltage switch cell which is economical in production and operation.

An object of the invention is to provide a high voltage switch cell which functions with efficiency, effectiveness and reliability.

In accordance with the invention, a high voltage switch cell comprises a cable terminal for a cable having a high voltage cable core. A circuit device electrically connects a bus bar to the cable terminal. The cable terminal has an insulating body for supporting the cable core of the cable relative to ground. A voltage transformer is structurally combined with the cable terminal and has a dielectric comprising part of the insulating body of the cable terminal.

The voltage transformer is a capacitive voltage transformer having a pair of electrodes covering different parts of the surface of the insulating body of the cable terminal.

The insulating body of the cable terminal is a tube having a center region which is the dielectric of the voltage transformer. One end encloses the high voltage conductor and another end encloses the cable core of the cable and supports the cable core in electrical contact with a high voltage conductor.

A cover on the insulating body of the cable terminal at the other end thereof seals the insulating body at the other end and tightly clamps the cable.

A current transformer is mounted on the other end of the insulating body of the cable terminal.

A plug contact in the insulating body of the cable terminal electrically connects the cable core of the cable to the high voltage conductor.

The cable has a ground conductor and the cable is clamped by the cover of the insulating body at a ground contact of the ground conductor of the cable.

Electrically conducting means electrically conducts the measured value of the current transformer to indicating means and optically conducting means optically conducts the measured value of the voltage transformer to the indicating means.

The voltage transformer is a capacitive voltage transformer having a pair of electrodes covering different parts of the surface of the insulating body of the cable terminal. One of the electrodes is on the ground side of the voltage transformer. A semiconductor body of luminescent material is on the one of the electrodes. A photocell is in the area of indicating means. Light conducting means conducts the voltage-dependent light produced by the semiconductor body to the indicating means.

The insulating body of the cable terminal thus functions as the dielectric of the voltage transformer in the high voltage switch cell of the invention, and the voltage transformer is structurally combined with the cable terminal. The separately produced and separately assembled conventional cable terminals and transformers are thus replaced by the circuit device of the invention which may be manufactured as a unit and which may be replaced and inserted as a unit. The structural combination may be further enhanced by providing ground potential at the side of said combination which is farther from the free end of the cable terminal, since in such region the shielding and armor of the cable are to be connected to ground. From a dielectric point of view, this largely provides the same conditions as during the measurement of the voltage between the high voltage conductor and ground in a transformer. This results in a simplification of the cable entry and a saving of space without additional effort or expense.

The switch cell of the invention is particularly easy to provide with the voltage transformer comprising a capacitive transformer having electrodes which cover parts of the surface of the insulating body of the cable terminal. The insulating body of the cable terminal preferably comprises a cast resin body. The electrodes are provided as conductive layers coated on the insulating body. Suitable electrically conducting layers may comprise, for example, a conductive varnish. The cast resin body determines the shape of the electrodes of the capacitive transformer.

The insulating body may comprise a laminated body having a plurality of laminations or sheets of a desired electrode configuration. The laminations or sheets may be utilized as formed members in the manufacture of cast resin bodies. The cast resin body is formed by the electrodes.

As hereinbefore described, the insulating body of the cable terminal preferably comprises a tube having a center region which functions as the dielectric of the voltage transformer. One end of the insulating tube encloses a high voltage conductor and the other end of the tube encloses the cable core of the cable terminal, which is in electrical contact with the high voltage conductor. The insulating tube is of substantially cylindrical configuration and is relatively easy to produce. If necessary, the insulating tube may be sealed and, under certain circumstances, may be filled with a high valency dielectric of a type usually utilized with cable terminals. The switch cell of the invention is most preferable for synthetic cables having cable terminals which do not require a liquid or gaseous dielectric.

Additional simplification is provided by mounting a current transformer on the end of the insulating body which encloses the cable core of the cable terminal. The device thereby provided thus functions to determine, at one locality, all measured quantities for controlling the high voltage switch cell. The cable core of the cable terminal functions as the primary conductor of the current transformer.

As hereinbefore described, the cable core of the cable terminal may be electrically connected to the high voltage conductor via a plug contact. This considerably facilitates the assembly of the cable terminal.

The insulating body may then be readily removed at the end enclosing the cable core of the cable terminal, after the high voltage conductor is disconnected, to free the cable. The device may be assembled by reinserting the insulating body so that the plug contact provides a reliable electrical connection, adjusted to the current, between the cable terminal and the high voltage conductor. In order to assist in this purpose, the cable is preferably provided with a massive bolt, which may be soldered on said cable, for example, for absorbing the contact forces necessary for current transmission.

As hereinbefore described, the end of the insulating body enclosing the cable terminal may be provided with a cover which seals said insulating body and tightly clamps the cable terminal. The tight clamping of the cable terminal prevents the cable from being disconnected from the plug contact when high current forces prevail. The clamping area may also be provided as a ground contact for the ground conductor of the cable. In a high current switch cell, two parallel connected cables may be clamped by the cover at the end of the insulating tube. The two cables together provide the necessary electrically conductive cross-sectional area and are affixed to each other by the insulating body.

As hereinbefore described, the measurand or measured value of the current transformer may be conducted to an indicator by electrical means and the measurand or measured value of the voltage transformer may be conducted to the indicator by optical means. This eliminates the influence of the considerably higher secondary currents of the current transformer on the very small currents of the voltage transformer. The electrode of the capacitive voltage transformer, on the ground side, is preferably provided with a semiconductor body comprising luminescent material. The voltage-dependent light produced by the semiconductor body is then conducted by a light conductor to a photocell in the area of the indicator. The luminescent material may be sprayed onto the insulating body, or upon a resistance material applied to the insulating body, so that said luminescent material is between the ground side electrode of the capacitive voltage transformer and a part at ground potential such as, for example, a fastening flange of the insulating body.

In order that the invention may be readily carried into effect, it will now be described with reference to the accompanying drawings, wherein:

FIG. 3 is a view, similar to FIG. 2, showing some details of the indicating means.

In the Figs., the same components are indicated by the same reference numerals.

Figure 1:
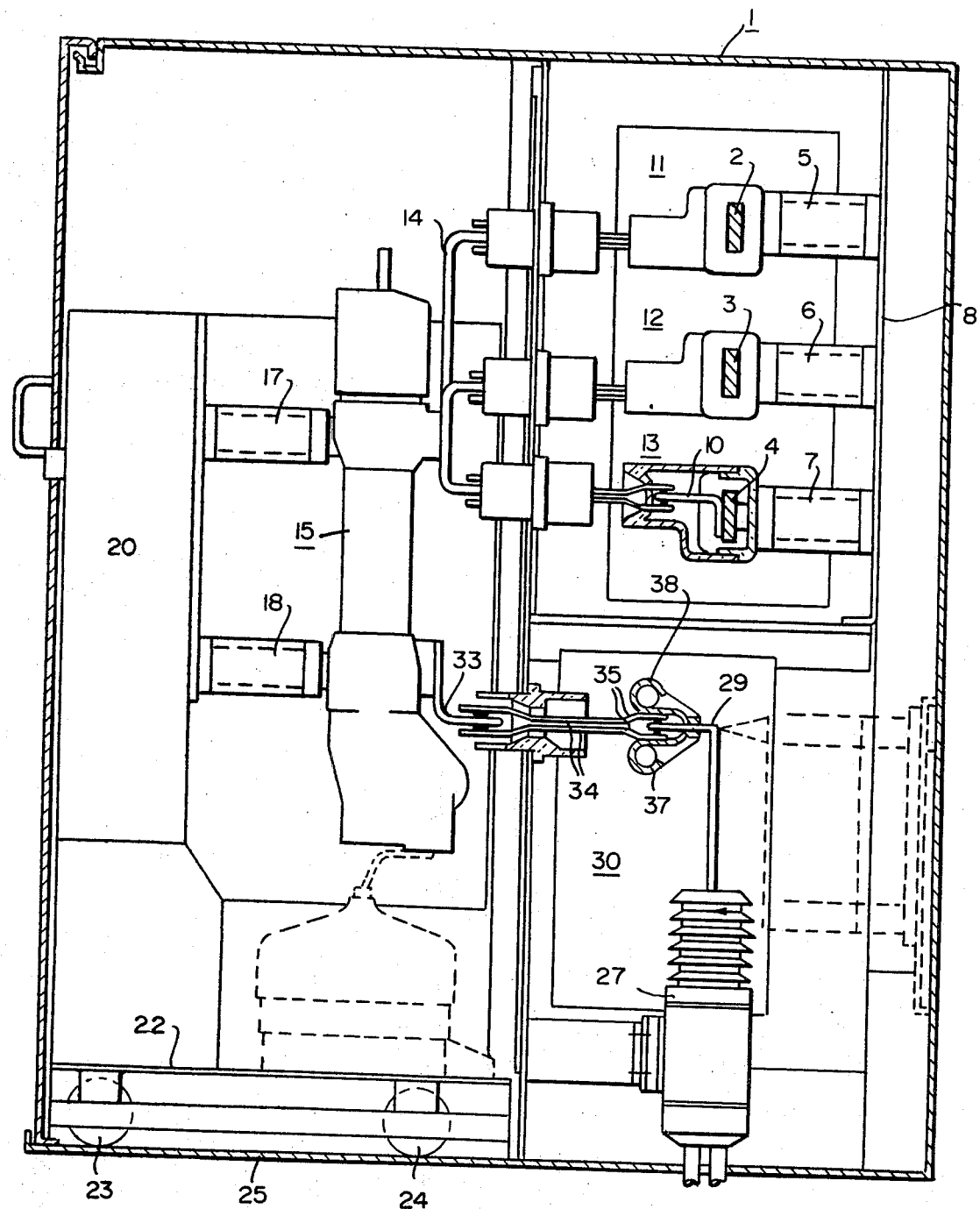
FIG. 1 is a schematic diagram, partly in section, of an embodiment of the high voltage switch cell of the invention.

In FIG. 1, the high voltage switch cell, which may operate at 20 kilovolts, for example, is housed in a metal housing 1. The housing 1 may comprise sheet metal. Three bus bars 2, 3 and 4 are positioned in the housing 1. The bus bar 2 is affixed to an intermediate wall 8 by an insulator 5. The bus bar 3 is affixed to the intermediate wall 8 by an insulator 6. The bus bar 4 is affixed to the intermediate wall 8 by an insulator 7.

As shown in the sectional view of the bus bar 4, each of the bus bars has a flat copper conductor 10 affixed thereto. Each of the flat copper conductors 10 is bent at substantially right angles, with one leg of the right angle affixed to the corresponding bus bar by any suitable means such as, for example, bolts, and with the other leg functioning as the stationary part of a plug connection. The bus bar 2 has a plug connection 11. The bus bar 3 has a plug connection 12. The bus bar 4 has a plug connection 13.

A power switch 15 has connecting leads 14 which are connected to the bus bars 2, 3 and 4 via the plug connections 11, 12 and 13, respectively. The power switch 15 is affixed to a driving or operating housing 20 via support insulators 17 and 18. The housing 20 is supported by a carriage 22. The carriage 22 has wheels 23 and 24 which roll on a moving bottom 25 of the housing 1.

A cable terminal 27 is positioned below the bus bars 2, 3 and 4. A flat copper conductor 29, bent at right angle, extends from the cable terminal 27. The copper conductor 29 functions as the stationary part of a plug connection 30 for a connecting lead 33 of the power switch 15. The plug connection 30 includes a pair of flat copper bus bars 34 which are bent at angles so that they are spaced at a greater distance from each other at each end thereof. The bus bars 34 remain substantially parallel to each other throughout most of their length. The ends 35 of the bus bars 34 are thus bent away from each other and elastically press against the flat copper conductor 29.

Two control electrodes 37 and 38 are affixed to the flat conductor 29 and facilitate the closing of the plug connection. The control electrodes 37 and 38 also function to make the electric field more uniform so that the applied voltage may be maintained with only slight interruptions.

Figure 2:
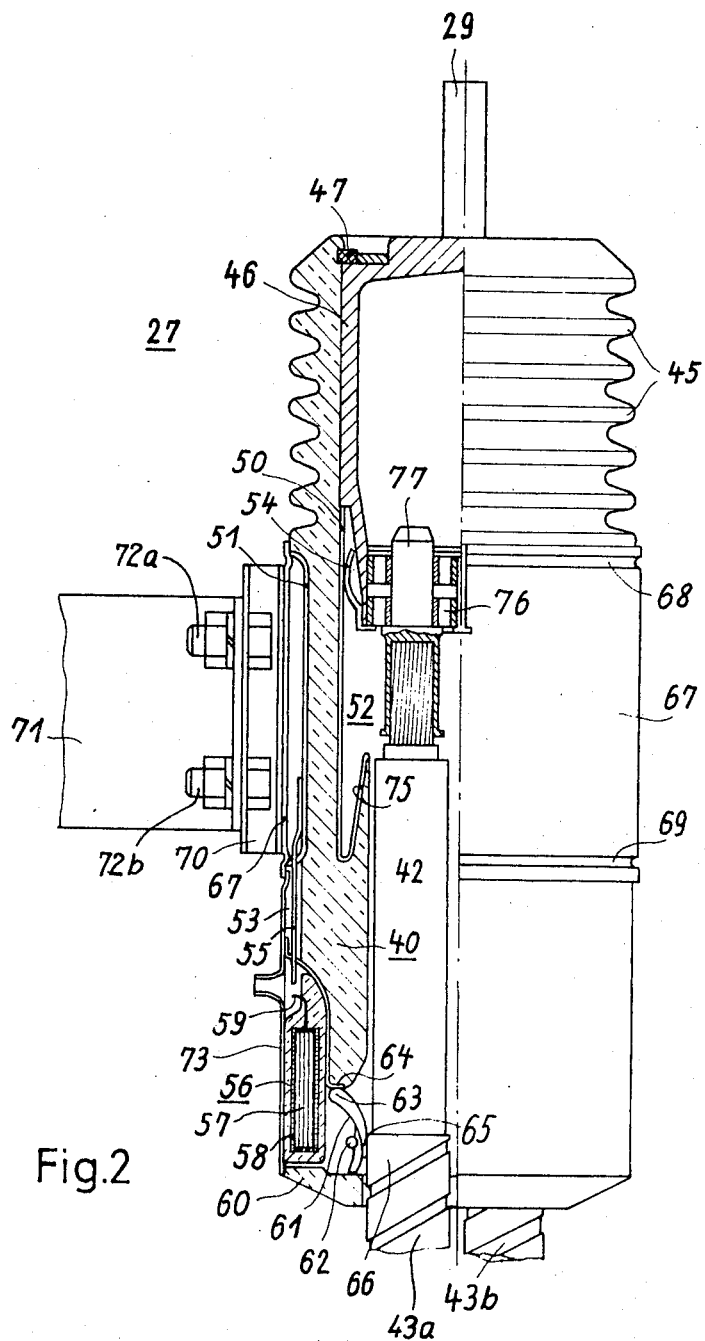
FIG. 2 is a cutaway view, partly in section, of an embodiment of the circuit device of the invention.

The cable terminal is shown on a considerably enlarged scale in FIG. 2. The left half of the cable terminal in FIG. 2 is shown in cutaway or sectional view. The principal component of the cable terminal 27 is an insulating body 40. The insulating body 40 preferably comprises cast resin of substantially cylindrical shape, as illustrated. The insulating body 40 encloses the high voltage cable core 42 of each of a pair of parallel connected high voltage cables 43a and 43b.

The high voltage cables 43a and 43b are enclosed by polyethylene insulation. The cables 43a and 43b are enclosed at an end of the cylindrical insulating body 40. At the end of the cylindrical insulating body 40 opposite that which encloses the cables 43a and 43b, said insulating body has ribs 45 formed on its outer surface. A high voltage conductor 46 is inserted in the end of the insulating body 40 at which the ribs 45 are formed. The high voltage conductor 46 extends from its end of the cylindrical insulating body 40 via a flat copper conductor 29. The high voltage conductor 46 is fixed in position by a snap ring 47 which engages a groove formed on the inside surface of the insulating body 40 at the end thereof which encloses the high voltage conductor 46.

The insulating body 40 has an inside electrode 50 affixed to its inside surface in the center region of said insulating body and an outside electrode 51 affixed to its outside surface in said center region. The electrodes 50 and 51 may comprise a conductive varnish applied to specific parts of the insulating body 40 and function, together with the dielectric of said insulating body, as a capacitive voltage transformer 52.

The inside electrode 50 is electrically connected to the high voltage conductor 46 via an elastic bracket 54. The outside electrode 51 is electrically connected to a lead 55 which extends, at the lower part of the insulating body 40, into a depression 53. The depression 53 is formed on the outside of the insulating body 40 and the lead 55 extends to an appropriate indicating or measuring device.

A current transformer 56 is provided at the lower end of the insulating body 40. The current transformer 56 is constructed as an attachable ring enclosing a laminated ring core 57 and a low voltage winding 58 seated on said core. The high voltage winding is the high voltage cable core 42 of the cables 43a and 43b. A connecting lead 59 from the low voltage winding 58 extends into the depression 53 of the insulating body 40.

The lower end of the insulating body 40 is sealed by a cover 60 of insulating material. When the cover 60 is pressed against the current transformer 56, a plurality of contact laminations or sheets 61 are spread apart, against the force of an annular or ring spring 62. One end 63 of each of the laminations or sheets 61 is in abutment with a ground conductor 64 and the other end 65 of each of said laminations or sheets is in abutment with a metal cover or armor 66 of the cables 43a and 43b, which armor is grounded. The cables 43a and 43b are thus grounded and tightly clamped by the cover 60.

The insulating body 40 of the cable terminal 27 is surrounded at its center region by a lamination, sheet, sleeve, wrapping, or the like, 67 which is fastened to said insulating body via two reinforcing ribs 68 and 69. A sheet flange 70 is welded to the sleeve 67. The sheet flange 70 may be affixed to a metal support member 71 by any suitable means such as, for example, bolts 72a and 72b.

Another sheet, lamination, sleeve, wrapping, or the like, 73 is provided around the end of the insulating body 40 which encloses the cables 43a and 43b. The sleeve 73 covers the current transformer 56 and permits the cover 60 to be affixed to the insulating body 40. The cover 60 may be inserted into the end of the sleeve 73.

In order to equalize the voltage stress in the insulating body 40, the inside electrode of the capacitive voltage transformer 52 is provided with a bent end portion 75 which points toward the end of said insulating body which encloses the cables 43a and 43b. The bent edge portion of the inside electrode 50 comprises the same material as the outside electrode 51. The material of the bent edge portion 75 of the inside electrode 50 and of the outside electrode 51 comprises a conductive layer of epoxide resin varnish having metal powder. The epoxide resin preferably has the same basic substance as the cast resin of the insulating body 40.

A plug contact 76 provides an electrical connection between the cables 43a and 43b and the high voltage conductor 46. The plug contact 76 comprises elastic contact laminations or sheets affixed to the high voltage conductor 46. The cable core 42 of each of the cables 43a and 43b engages the plug contact 76 via a clamped or otherwise suitably affixed bolt 77. The bolt 77 may be soldered, for example.

In the illustrated embodiment, the measurand or measured value of the voltage transformer 52 is galvanically transmitted to a measuring or indicating device, as is the measurand or measured value of the current transformer 56. Instead of galvanic transmission of the measurands of the voltage transformer 52 a layer of resistance material having luminescent characteristics may be provided on the outside surface of the insulating body 40. The luminescent material produces a specific amount of light depending upon the voltage. The light is preferably directed via a lens system 80 and is transmitted via a light conductor 81 to a measuring or indicating device 82, wherein a photocell 83 is positioned and receives the measured value or measurand. (FIG. 3)

The light conductor 81 may comprise a rod of transparent material having an index of refraction which is higher than that of air and which conducts the light entering at one end thereof to the other end thereof, almost without loss, and via bends or angles in the rod. The light emerges from the other end. This type of light conductor permits the measurand or measured values of the voltage transformer 52, having little or weak energy, to be guided through the relatively high measured values or measurand of the current transformer, to the measuring or indicating device of the voltage. The measurands may be shielded at the indicating or measuring device.

FIG. 1 illustrates, in broken lines, a voltage transformer seated on the carriage 22, and a current transformer affixed to the rear wall of the housing 1. Such voltage and current transformers are eliminated by the switch cell of the invention. The space, which would otherwise by utilized by the voltage and current transformers, may thus be utilized for other components or may be utilized to reduce the size of the switch cell.

While the invention has been described by means of a specific example and in a specific embodiment, we do not wish to be limited thereto, for obvious modifications will occur to those skilled in the art without departing from the spirit and scope of the invention.

We claim:

1. A cable terminal for high voltage cables having high voltage cable cores used in high voltage switch cells, comprising a bus bar, a voltage transformer structurally combined with the cable terminal, a current transformer and a switching device connecting the bus bar to the cable terminal, said cable terminal comprising an insulating body supporting the cable core relative to ground, the insulating body forming the dielectric for the voltage transformer, indicating means, electrically conducting means for electrically conducting the measured value of the current transformer to the indicating means, and optically conducting means for optically conducting the measured value of the voltage transformer to the indicating means.

2. A high voltage switch cell as claimed in claim 1, wherein said voltage transformer is a capacitive voltage transformer having a pair of electrodes covering different parts of the surface of the insulating body of the cable terminal.

3. A high voltage switch cell as claimed in claim 1, further comprising a high voltage conductor, and wherein the insulating body of the cable terminal is a tube having a center region which is the dielectric of the voltage transformer, one end enclosing the high voltage conductor and another end enclosing the cable core of the cable and supporting said cable core in electrical contact with said high voltage conductor.

4. A high voltage switch cell as claimed in claim 3, further comprising a cover on the insulating body of the cable terminal at the other end thereof sealing said insulating body at said other end and tightly clamping the cable.

5. A high voltage switch cell as claimed in claim 3, further comprising a current transformer mounted on the other end of the insulating body of the cable terminal.

6. A high voltage switch cell as claimed in claim 3, further comprising a plug contact in the insulating body of the cable terminal for electrically connecting the cable core of the cable to the high voltage conductor.

7. A high voltage switch cell as claimed in claim 4, wherein the cable has a ground conductor and said cable is clamped by the cover of said insulating body at a ground contact of the ground conductor of said cable.

8. A high voltage switch cell, comprising
a cable terminal for a cable having a high voltage cable core;
a bus bar;
a circuit device for electrically connecting the bus bar to the cable terminal, said cable terminal having an insulating body for supporting the cable core of the cable relative to ground;
a voltage transformer structurally combined with the cable terminal and having a dielectric comprising part of the insulating body of the cable terminal;
a high voltage conductor, the insulating body of the cable terminal being a tube having a center region which is the dielectric of the voltage transformer, one end enclosing the high voltage conductor and another end enclosing the cable core of the cable and supporting said cable core in electrical contact with said high voltage conductor;
a current transformer mounted on the other end of the insulating body of the cable terminal;
indicating means;
electrically conducting means for electrically conducting the measured value of the current transformer to the indicating means; and
optically conducting means for optically conducting the measured value of the voltage transformer to the indicating means.

9. A high voltage switch cell as claimed in claim 8, wherein the voltage transformer is a capacitive voltage transformer having a pair of electrodes covering different parts of the surface of the insulating body of the cable terminal, one of said electrodes being on the ground side of said voltage transformer, and further comprising a semiconductor body of luminescent material on said one of said electrodes, indicating means, a photocell in the area of said indicating means, and light conducting means for conducting the voltage-dependent light produced by said semiconductor body to said indicating means.

* * * * *